3,007,975
4,4'-BIS-(CHLOROMETHYL)-BIPHENYL
John T. Massengale and Theodore H. Fairbanks, West Chester, Pa., assignors to American Viscose Corporation, Philadelphia, Pa., a corporation of Delaware
No Drawing. Filed Apr. 24, 1959, Ser. No. 808,589
12 Claims. (Cl. 260—649)

This invention relates to an improved method for making 4,4'-bis-(chloromethyl)-biphenyl. More particularly, this invention relates to an improved process of preparing 4,4'-bis-(chloromethyl)-biphenyl utilizing a novel catalyst system.

Methods of making 4,4'-bis-(chloromethyl)-biphenyl have been proposed before in the prior art. One of these methods generally comprises reacting biphenyl with formaldehyde and hydrogen chloride in the presence of a zinc chloride catalyst. It was found, however, that the yield, of 4,4'-bis-(chloromethyl)-biphenyl resulting from these methods was low and was accompanied by the production of isomers which were difficult to separate.

This invention has for its object to provide an improved method for making 4,4'-bis-(chloromethyl)-biphenyl which results in an increased yield and a relative absence of isomers.

In accordance with the present invention, biphenyl, formaldehyde and hydrogen chloride are reacted together in the presence of a novel catalyst system comprising water and zinc chloride. Yields of from about 30 to 70% by weight of easily recoverable 4,4'-bis-(chloromethyl)-biphenyl which are essentially free of isomers, analogues and polymers are obtained when prepared according to the present invention. It is essential in order to produce this product in these yields and having this purity that both the ratio of zinc chloride to water present in the reaction vessel at the beginning of the reaction and the ratio of zinc chloride to biphenyl be controlled within critical and relatively narrow limits.

Although high yields of essentially pure 4,4'-bis-(chloromethyl)-biphenyl are obtained utilizing a catalyst system containing zinc chloride and water in the amounts described herein, high yields of this product having higher purity are more consistently obtained wherein a lower aliphatic monocarboxylic acid constitutes a third component in this catalyst system.

The ratio of zinc chloride to water in the novel catalyst system of this invention at the start of the reaction can be generally varied between 1.5 to 4 parts by weight of zinc chloride to 1 part by weight of water. High yields are more frequently obtained, however, when this ratio of zinc chloride to water is restricted to a ratio of 2.2 to 3.2 parts by weight of zinc chloride to 1 part by weight of water. In a preferred embodiment, the ratio of zinc chloride to water consists essentially of 2.8 parts by weight of zinc chloride to 1 part by weight of water. On the other hand, it is necessary in conducting this reaction under the conditions described above that certain limited amounts of zinc chloride be present in proportion to the amount of biphenyl. Thus the reaction of biphenyl, formaldehyde and hydrogen chloride must be carried out in the presence of between about 1.2 and 2.55 mols of zinc chloride to 1 mol of biphenyl in order to obtain the high yields of essentially pure product disclosed herein. Preferably for every mol of biphenyl utilized in this reaction, about 1.65 mols of zinc chloride are utilized.

Still further, in order to consistently obtain yields in the 60 to 70% by weight quantity, it is preferred that the catalyst system contain in addition to the stated quantities of water and zinc chloride between 1 and 8 mols of a lower aliphatic monocarboxylic acid for each mol of biphenyl. Practicable working conditions dictate a ratio of between about 3 and 5 mols of one of these acids to 1 mol of biphenyl. In a preferred embodiment, glacial acetic acid is utilized as the third component of this catalyst system in a proportion of 4 mols of this acid to 1 mol of biphenyl. Other acids which have been used include formic acid and propionic acid.

In general, stoichiometric amounts of biphenyl and formaldehyde are reacted in a system substantially saturated with hydrogen chloride in the presence of the novel catalyst system of this invention to produce 4,4'-bis-(chloromethyl)-biphenyl. Smaller than stoichiometric amounts of formaldehyde have been used according to this invention producing essentially pure 4,4'-bis-(chloromethyl)-biphenyl in yields between 35 and 50% by weight. On the other hand, increasing the proportion of formaldehyde above the stoichiometric amount neither decreases nor increases the yields or purity as long as the zinc chloride/water ratio described herein is maintained. Thus, for 1 mol of biphenyl, one can use as little as 1.5 mols of formaldehyde as well as 3.0 or more mols thereof, whereas a stoichiometric amount of hydrogen chloride, or any excess thereover, can be used in the reaction.

In the preferred reaction with biphenyl, the formaldehyde is present as paraformaldehyde containing no more than about 5% water, the zinc chloride in a form containing no more than about 5% water by weight and the monocarboxylic acid as glacial acetic acid containing no more than 1% by weight of water. Thus the bulk of the water added to the system in order to produce the stated zinc chloride/water ratio generally stems from a source other than the reactants and the zinc chloride. Thus it is preferred that the water added to the system be added as concentrated hydrochloric acid. On the other hand, this reaction has been run with high yields and purity utilizing formalin (37% by weight formaldehyde); likewise, other forms of zinc chloride and monocarboxylic acids can be utilized containing higher water contents than these as long as the stated zinc chloride/water ratio is maintained.

In carrying out the reaction a flask is equipped with an inlet tube for hydrogen chloride, a stirrer, a thermometer, a condenser and an exit gas bubble trap. The flask is charged with the biphenyl, formaldehyde, zinc chloride, acetic acid, hydrochloric acid, water and a solvent for the 4,4'-bis-(chloromethyl)-biphenyl such as cyclohexane. A stream of dry hydrogen chloride is passed into the flask at substantially the level of the liquid (or just above or just below this level) with stirring. The reaction is carried out at atmospheric pressure and the temperature of the reaction from the beginning to the end is from 40 to 60° C. The 4,4'-bis-(chloromethyl)-biphenyl that is formed is dissolved in additional cyclohexane and is separated from the catalyst and other reaction products. The cyclohexane layer is washed and the 4,4'-bis-(chloromethyl)-biphenyl is separated by chilling the solution to a low temperature and filtering off the 4,4'-bis-(chloromethyl)-biphenyl which is a solid at lower temperatures.

The 4,4'-bis-(chloromethyl)-biphenyl in readily recoverable form may be obtained by this method in yields of 30 to 70 percent of the theoretical yield. In addition, the residue may contain from 10 to 15% by weight of 4,4'-bis-(chloromethyl)-biphenyl which can also be recovered such as by distillation. Accordingly with this method a total of 30 to 85% of the theoretical yield of 4,4'-bis-(chloromethyl)-biphenyl may be obtained.

The aqueous layer from which the 4,4'-bis-(chloromethyl)-biphenyl in the solvent has been removed may be recycled as part of the catalyst and other raw material in further reactions for making the 4,4'-bis-(chloromethyl)-biphenyl by this method.

The 4,4'-bis-(chloromethyl)-biphenyl that is formed may be oxidized to form bibenzoic acid by a number of various procedures. One of these procedures is the oxidation method wherein the 4,4'-bis-(chloromethyl)-biphenyl is reacted with sodium hypochlorite and sodium hydroxide. The 4,4'-bis-(chloromethyl)-biphenyl being a reactive and versatile reactant, it may be used in the synthesis of other di-functional acids, amines, glycols and condensation polymers including the Bakelite type.

The following examples are illustrative of the invention only, the scope of the invention being determined by the appended claims.

*Example 1*

To a 1 liter glass reaction vessel, autoclave type with stirrer, thermometer, gas inlet tube, and reflux condenser, was charged 102.6 g. biphenyl (0.67 mol), 46.0 g. paraformaldehyde (1.45 mols), 160.0 g. zinc chloride (95%), 160.0 ml. glacial acetic acid, 70.0 ml. concentrated hydrochloric acid, and 200.0 ml. cyclohexane to give a zinc chloride/biphenyl mol ratio of 1.67/1 and a zinc chloride/water weight ratio of 2.39/1. Dry hydrogen chloride was admitted just below liquid level and the reaction mixture was agitated. There was a rapid absorption of HCl gas accompanied by a temperature rise to 55° C. Heat was then applied by a hot water bath and the temperature of the mixture was held at 58–60° C. for a total of 5.0 hours. The mixture was kept saturated with dry hydrogen chloride throughout the experiment. Two and one-half hours after startup, hydrogen chloride absorption was negligible; and at 5.0 hours, the mixture had become quite thick with products but it was still stirrable. 100 ml. hot (70° C.) water was added to dilute the catalyst and the mixture was transferred to a 5 liter flask in which 2½ liters of hot (65° C.) cyclohexane was added to dissolve all products. The lower aqueous catalyst layer was separated. The upper layer, containing the product, was thoroughly washed with water (70° C.) to remove traces of zinc chloride and other water-soluble materials. The washed upper layer was chilled to 5° C. for one-half hour and the product 4,4'-bis-(chloromethyl)-biphenyl filtered off. The filter cake was washed once with 200 ml. chilled (10° C.) cyclohexane and dried in an oven at 90° C. to a constant weight of 107.0 g. The filtrate from the upper layer was evaporated to one-fifth its original volume, again chilled to 5° C., filtered, and the small, second crop of 4,4'-bis-(chloromethyl)-biphenyl recovered thereby dried to a constant weight of 8.0 g. The melting point of the first crop of 4,4'-bis-(chloromethyl)-biphenyl was 128–135° C., the second crop melted at 123–129° C. Pure 4,4'-bis-(chloromethyl)-biphenyl melts at 136° C. The total of 115.0 g. represented a 68.9% yield based on biphenyl. The filtrate remaining after recovery of the second crop was distilled to remove all solvent and there was left 37.5 g. of yellow, oily residue with a percent chlorine of 20.0 and a molecular weight of 208–215 (for 4-chloromethylbiphenyl, percent Cl=17.6 and M.W.=202.5).

*Example 2*

The technique and procedure of Example 1 is repeated, but instead of 70.0 ml. of concentrated hydrochloric acid, 97.0 ml. thereof is charged to the reaction vessel to give a zinc chloride/water weight ratio of 1.82/1. All other materials are the same as in Example 1. A 41.3% yield of 4,4'-bis-(chloromethyl)-biphenyl is obtained.

*Example 3*

The conditions, reactants and quantities of Example 1 were used except only 40.0 ml. of concentrated hydrochloric acid was used to give a zinc chloride/water weight ratio of 3.66/1. A 39.2% yield of 4,4'-bis-(chloromethyl)-biphenyl was obtained.

*Example 4*

The conditions, reactants and quantities of Example 1 were used except that no acetic acid was charged. A 48.0% yield of 4,4'-bis-(chloromethyl)-biphenyl was obtained.

*Example 5*

The conditions, reactants and quantities of Example 1 were used; however, 100.0 ml. of concentrated hydrochloric acid was charged instead of 70.0 ml. and the acetic acid was omitted giving a zinc chloride/water weight ratio of 1.8/1. A 40.0% yield of 4,4'-bis-(chloromethyl)-biphenyl was obtained.

*Example 6*

The conditions, reactants, and quantities of Example 1 were used except 50.0 ml. of concentrated hydrochloric acid was used and the acetic acid was omitted giving a zinc chloride/water weight ratio of 3.21/1. A 42.0% yield of 4,4'-bis-(chloromethyl)-biphenyl was obtained.

*Example 7*

The procedure of Example 1 is repeated except that 160 ml. of propionic acid are substituted for the glacial acetic acid thereof producing a 70.0% yield of 4,4'-bis-(chloromethyl)-biphenyl.

*Example 8*

The procedure of Example 1 is repeated except that 160 ml. of formic acid are substituted for the glacial acetic acid thereof producing a 48.7% yield of 4,4'-bis-(chloromethyl)-biphenyl.

*Example 9*

The procedure of Example 1 is repeated except that 37.0 g. of para-formaldehyde are used instead of the 46.0 g. thereof in Example 1 giving a zinc chloride/water weight ratio of 2.40/1. A yield of 43.7% 4,4'-bis-(chloromethyl)-biphenyl is obtained.

*Example 10*

The procedure of Example 1 is repeated except that 60.0 g. of para-formaldehyde are substituted for the 46.0 g. thereof and 60.0 ml. of concentrated hydrochloric acid are used in place of the 70.0 ml. thereof to give a zinc chloride/water weight ratio of 2.67/1. A yield of 59.7% 4,4'-bis-(chloromethyl)-biphenyl is obtained.

*Example 11*

The procedure of Example 1 is repeated except that 240.0 g. of zinc chloride are substituted for the 160.0 g. thereof in Example 1 giving a zinc chloride/water weight ratio of 2.60/1 and a zinc chloride/biphenyl mol ratio of 2.51/1. A yield of 63.3% 4,4'-bis-(chloromethyl)-biphenyl is obtained.

*Example 12*

The procedure of Example 1 is repeated except that 40.0 ml. of glacial acetic acid and 52.0 g. of para-formaldehyde are used to give a zinc chloride/water weight ratio 2.42/1. A yield of 55.8% 4,4'-bis-(chloromethyl)-biphenyl is obtained.

*Example 13*

The procedure of Example 1 is repeated except that 320.0 ml. of glacial acetic acid and 52.0 g. of para-formaldehyde are used to give a zinc chloride/water weight ratio 2.32/1. A yield of 35.6% 4,4'-bis-(chloromethyl)-biphenyl is obtained.

In each of the foregoing examples, the yields of 4,4'-bis-(chloromethyl)-biphenyl are calculated as a percentage of the biphenyl starting material and concentrated hydrochloric acid is 37% by weight hydrogen chloride in water.

We claim:
1. A process of preparing 4,4'-bis-(chloromethyl)-biphenyl which comprises reacting biphenyl, formaldehyde and hydrogen chloride in the presence of a catalyst system comprising zinc chloride and water in a weight ratio at the start of the reaction of about 1.5 to 4 parts of zinc chloride to 1 part of water and wherein said zinc chloride is present in a ratio of 1.2 to 2.55 mols of zinc chloride per mol of biphenyl present at the start of the reaction.

2. The process of claim 1 wherein the water component of said catalyst system comprises concentrated hydrochloric acid having a hydrogen chloride content of about 37%.

3. The process of claim 2 wherein said weight ratio constitutes 2.2 to 3.2 parts of zinc chloride to 1 part of water.

4. The process of claim 2 wherein said weight ratio constitutes apporximately 2.8 parts of zinc chloride to 1 part of water.

5. Process of claim 2 wherein said catalyst system consists essentially of water, zinc chloride and a lower aliphatic monocarboxylic acid.

6. Process of claim 5 wherein said lower aliphatic monocarboxylic acid is glacial acetic acid.

7. The process of claim 6 wherein said weight ratio constitutes 2.2 to 3.2 parts of zinc chloride to 1 part of water.

8. The process of claim 6 wherein said weight ratio constitutes approximately 2.8 parts of zinc chloride to 1 part of water.

9. Process of claim 8 wherein said zinc chloride is present in a ratio of approximately 1.65 mols of zinc chloride per mol of biphenyl.

10. Process of claim 5 wherein said lower aliphatic monocarboxylic acid is formic acid.

11. Process of claim 5 wherein said lower aliphatic monocarboxylic acid is propionic acid.

12. In a process of preparing 4,4-bis-(chloromethyl)-biphenyl by the reaction of biphenyl, formaldehyde and hydrogen chloride, the improvement comprising increasing the yield of said product by conducting said reaction in the presence of a catalyst system comprising zinc chloride, water, and a lower aliphatic monocarboxylic acid, said zinc chloride and water being present in a weight ratio at the start of the reaction of about 2.2 to 3.2 parts of zinc chloride to 1 part of water, the ratio of zinc chloride to biphenyl at the start of the reaction being 1.2 to 2.55 mols of zinc chloride per mol of biphenyl, and thereby producing said 4,4'-bis-(chloromethyl)-biphenyl product in a yield of up to 85% of the theoretical yield.

References Cited in the file of this patent

UNITED STATES PATENTS 2,859,253     Snow _____ Nov. 4, 1958

FOREIGN PATENTS 603,498     Great Britain _____ June 17, 1948

OTHER REFERENCES

Riemschneider: Chem. Abst., 43, 9332 (1949).